United States Patent
Ahn et al.

(10) Patent No.: US 6,682,658 B2
(45) Date of Patent: Jan. 27, 2004

(54) TRANSPARENT ELECTRODE MADE FROM INDIUM-ZINC-OXIDE AND ETCHANT FOR ETCHING THE SAME

(75) Inventors: You Shin Ahn, Kumi-shi (KR); Hu Kag Lee, Kumi-shi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/749,038

(22) Filed: Dec. 28, 2000

(65) Prior Publication Data

US 2002/0070197 A1 Jun. 13, 2002

(30) Foreign Application Priority Data

Dec. 28, 1999 (KR) .......................... P99-63228

(51) Int. Cl.[7] .................. H01G 13/00; H01L 21/00; H01L 21/302
(52) U.S. Cl. ................ 216/6; 438/30; 438/745
(58) Field of Search ............. 438/30, 745; 252/79.1; 216/6

(56) References Cited

U.S. PATENT DOCUMENTS 4,699,470 A * 10/1987 McLaughlin et al. ....... 349/152
RE33,921 E * 5/1992 McLaughlin et al. ....... 349/152
5,319,206 A * 6/1994 Lee et al. ............... 250/370.09
5,952,779 A * 9/1999 Arai et al. ................... 313/504
5,969,474 A * 10/1999 Arai ........................... 313/504

FOREIGN PATENT DOCUMENTS

JP  7333656       12/1995
JP  11264995 A  *  9/1999  ......... G02F/1/1343

OTHER PUBLICATIONS

Inoue, Manufacture of Liquid Crystal Display Device, Sep. 28, 1999, English Abstract of JP 11264995 A, 3pp.*

* cited by examiner

*Primary Examiner*—Nadine G. Norton
*Assistant Examiner*—Lynette T. Umez-Eronini
(74) *Attorney, Agent, or Firm*—Birch, Stewart, Kolasch & Birch, LLP

(57) ABSTRACT

A pixel electrode employs a transparent electrode made from indium-zinc-oxide (IZO) that is capable of preventing damage and bending thereof. In a liquid crystal display device containing pixel electrodes, the transparent electrode is made from indium-zinc-oxide (IZO) having an amorphous structure so that it can be etched within a short period of time with a low concentration of etchant. Accordingly, it is possible to prevent damage and bending of the transparent electrode upon the patterning thereof.

5 Claims, 5 Drawing Sheets

TRANSPARENT ELECTRODE MADE FROM INDIUM-ZINC-OXIDE AND ETCHANT FOR ETCHING THE SAME

BACKGROUND OF THE INVENTION

1. Field of the Invention

The present invention relates to a transparent electrode capable of improving etching characteristics. The present invention is also directed to an etchant suitable for etching a transparent electrode.

2. Description of the Related Art

Generally, a liquid crystal display (LCD) of an active matrix driving system uses thin film transistors (TFT's) as switching devices to display a natural moving picture. Since such a LCD can be made into a smaller device in size than the existent Brown tube, it has been widely used for a monitor for a personal computer or a notebook computer as well as for office automation equipment such as a copy machine, etc. and portable equipment such as a cellular phone, a pager, etc.

Recently, the active matrix LCD trends toward overlapping a pixel electrode 108 of a transparent electrode with a signal wire 106 such as a gate line or a data line as shown in FIG. 1 so as to enhance the aperture ratio. In this case, an organic insulating film 104 having a low dielectric constant is entirely coated on a substrate 102 provided with the signal wire 106 in order to minimize insulation between the signal wire 106 and the pixel electrode and a parasitic capacitance. The LCD having the pixel electrode 108 overlapped with the signal wire 106 has an aperture ratio which is improved by the overlapping area between the signal wire 106 and the pixel electrode 108 in comparison to a LCD in which the pixel electrode 108 does not overlap with the signal wire 106, but rather is spaced, by a desired distance (i.e., about 5 to 10 μm) from the signal 106.

The pixel electrode 108 is usually made from a transparent conductive material such as indium-tin-oxide (ITO). This ITO film is entirely deposited on the organic insulating film 104 and thereafter patterned in such a manner to overlap with the signal wire 106. Upon patterning of the ITO film, however, the edge portion of the ITO film may be often twisted or damaged after being etched with an etchant. If the edge portion of the ITO film formed on the organic insulating film 104 is twisted or damaged, then the width of the overlapping portion between the pixel electrode 108 and the signal wire 106 is narrowed which generates light leakage from the overlapping portion. Pattern badness of the ITO film is caused by a poor interface-bonding characteristic of the ITO film to the organic insulating film 104. Particularly, pattern badness is caused by a fact that the ITO film is etched with an etchant which has a high concentration of strong acid and also the etching of the ITO film is made at a low speed.

In order to reduce the bad pattern of the ITO film, a surface treatment process of the organic insulating film 104 for strengthening the adhesive force between the organic insulating film 104 and the ITO film is performed. An example of such a surface treatment includes a method of forming an acid film on the organic insulating film 104 using an acid such as $HNO_3$ or $H_2SO_4$, etc. Other examples include a method of forming a hydrogen film on the surface of the organic insulating film 104 or ion-doping the surface of the organic insulating film 104 with oxygen. Even when a surface treatment of the organic insulating film 104 is made, if the ITO film is etched by a doping system in which the substrate 102 is precipitated within a chamber filled with an etchant, then the etchant permeates into the interface between the organic insulating film 104 and the ITO film to generate the pattern badness of the ITO film as mentioned above. In this case, the etchant for etching the ITO film includes a high concentration of strong acid, and the etching thereof is conducted for a long time. For instance, the etchant for etching the ITO film has a very high acid concentration such that the ratio of oxalic acid ($C_2H_2O_4$) to de-ionized water is less than 1 to 10. The time required for etching the ITO film using such a high-concentration of etchant is more than 1000 seconds.

The ITO film has applications for a display device and an ink-jet head besides a LCD. Also, the ITO film is applicable to a pixel electrode for an X-ray detecting device having a structure similar to the active matrix LCD. However, in the device or equipment employing the ITO film, a transparent electrode or a pixel electrode, etc. applied with ITO is liable to generate a bad pattern because the etching characteristics of the ITO is poor.

SUMMARY OF THE INVENTION

Accordingly, it is an object of the present invention to provide a transparent electrode that has improved etching characteristics.

A further object of the present invention is to provide an etchant suitable for etching said transparent electrode.

In order to achieve these and other objects of the invention, a transparent electrode applied to a liquid crystal display device according to the present invention is made from indium-zinc-oxide (IZO) having an amorphous structure so that it can be etched in a short period of time with a low concentration of etchant.

A transparent electrode applied to an X-ray detecting device according to the present invention and electrodes consisting of a capacitor are made from indium-zinc-oxide (IZO) so is to have a fast etching speed.

An etchant for etching the transparent electrode, according to the present invention, is a mixture to which a desired compositional ratio of oxalic acid is added.

BRIEF DESCRIPTION OF THE DRAWINGS

These and other objects of the present invention will be apparent from the following detailed description of the embodiments of the present invention together with reference to the accompanying drawings, wherein.

DETAILED DESCRIPTION OF THE PREFERRED EMBODIMENT

Figure 1:
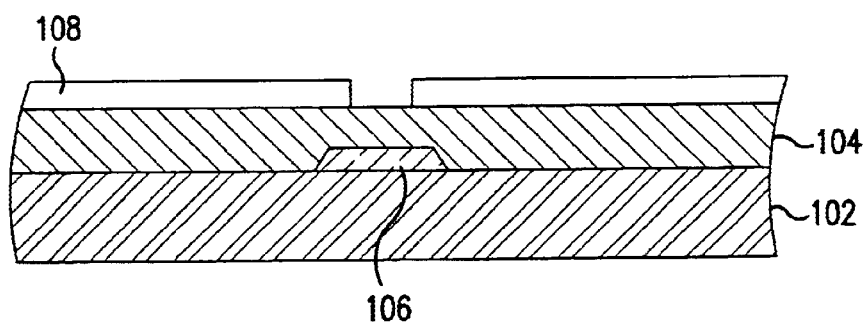
FIG. 1 is a schematic section view showing an overlap between a transparent electrode and a signal wire in a conventional liquid crystal display device.
Figure 2:
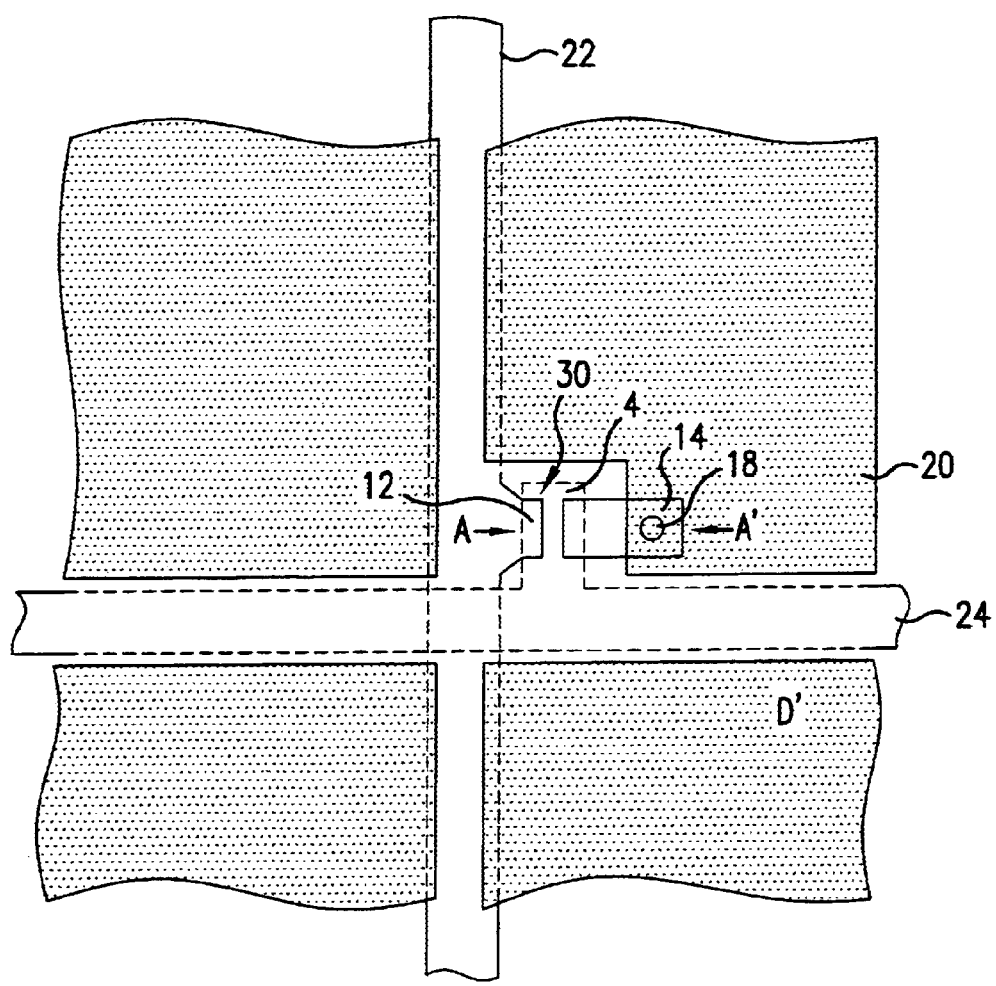
FIG. 2 is a plan view showing a structure of a liquid crystal display device according to one embodiment of the present invention.
Figure 3:
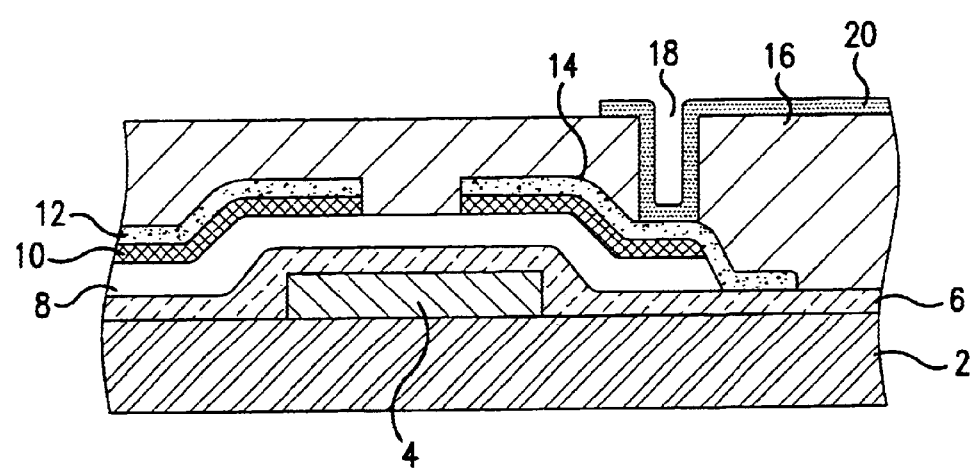
FIG. 3 is a section view of the liquid crystal display device taken along line A–A' of FIG. 2.

Referring to FIG. 2 and FIG. 3, there is shown a transparent electrode according to a first embodiment of the present invention, that is, a pixel electrode applied to a liquid crystal display device. In the present liquid crystal display device, a thin film transistor (TFT) 30 is provided at an intersection between a data line 22 and a gate line 24, and pixel electrodes 20 overlapping with the data line 22 are arranged in a matrix type. The data line 22 applies a video signal to each liquid crystal pixel cell. The gate line 24 applies a gate pulse synchronized with the video signal to a gate electrode 4 of the TFT 30. Each liquid crystal pixel cell includes a liquid crystal layer injected between the pixel electrode 20 and a common electrode (not shown). The liquid crystal layer is driven with an electric field between the pixel electrode 20 and the common electrode to control the transmitted light amount of incident light received thereto via a substrate.

The TFT 30 has a gate electrode 4 connected to the gate line 24, a source electrode 12 connected to the data line 22 and a drain electrode 14 connected to the pixel electrode 20. In order to provide the gate electrode 4 and the gate line 24, a metal layer is deposited on the substrate 2 by sputtering or a vacuum vapor deposition technique to a thickness of about 2500 Å. The metal layer is patterned by reaction ion etching after the formation of a photo mask. After the gate electrode 4 and the gate line 24 are formed on the substrate 2, a gate insulating film 6 made from a dielectric material such as $SiN_x$, etc. is deposited on the substrate 2 by a plasma enhanced chemical evaporation technique to cover the gate electrode 4 and the gate line 24. The gate insulating film 6 has a thickness of about 2000 to 3000 Å. A semiconductor layer 8 made from an amorphous silicon (a—Si) is deposited on the gate insulating film 6 to have a thickness of about 2000 Å, and an ohmic contact layer 10 made from an a—Si doped with n+ ions is deposited thereon having a thickness of about 500 Å. The semiconductor layer 8 and the ohmic contact layer 10 cover the gate insulating film 6 on the gate electrode 4. The source electrode 12 and the drain electrode 14, made from a metal, are deposited on the ohmic contact layer 10 to have a thickness of about 500 to 2000 Å. The source electrode 12 and the drain electrode 14 are patterned in such a manner as to be spaced by a predetermined channel width from each other. Subsequently, the ohmic contact layer 10 is etched along a channel defined between the source electrode 12 and the drain electrode 14 to expose the semiconductor layer 8. On the substrate 2 provided with the TFT 30, the data line 22 and the gate line 24, an organic insulating film 16 is entirely coated on an even basis by a spin coating technique. After the organic insulating film 16 is cured under a nitrogen atmosphere, a portion of the organic insulating film 16 covering each drain electrode 14 is etched. At this time, a contact hole 18 defined on the drain electrode 14 connects the drain electrode 14 to the pixel electrode 20. The pixel electrode 20 made from indium-zinc-oxide (IZO) is entirely deposited on the organic insulating film 16 provided with the contact hole 18. The pixel electrode 20 is also deposited within the contact hole 18 to be connected to the drain electrode 14. Finally, the pixel electrode 20 deposited on the organic insulating film 16 is photo-masked in such a manner to overlap with the side surface of the data line 22, and thereafter patterned by an etching.

The IZO selected as the material of the pixel electrode 20 is a transparent conductive compound in which $In_2O_3$ is mixed with ZnO in a desired ratio. The IZO can be etched by a low concentration of etchant and has the characteristic of being capable of being etched within a short period of time in a low concentration of etching liquid. Also, since the IZO has an amorphous structure, it has an excellent interface-bonding characteristic with respect to the organic insulating film 16. Thus, if the material of the pixel electrode 20 is made from IZO, then a surface treatment process for strengthening the adhesive force to the organic insulating film 16 can be omitted.

The IZO is deposited on the organic insulating film 16 by a sputtering technique, for example, a DC magnetron sputtering technique. Process conditions of the sputtering technique are indicated by the following table:

TABLE 1

| | |
|---|---|
| Substrate Temperature | 25~250° C. |
| Pressure within Chamber | 0.2~0.8 Pa |
| Flux Ratio of $O_2$/Ar gas | 0.15~1.0% |
| DC Power Density | 0.1~1.0 W/cm³ |
| Intensity of Magnetic Field | 500~1500 Gauss |

Since the IZO film deposited on the organic insulating film 16 in this manner has an excellent etching characteristic, the pixel electrode 20, particularly, the end portion of the pixel electrode 20 is not damaged or bent after it is etched. Also, the IZO film is precipitated in a low concentration of etchant having a low acid ratio and etched rapidly, even when it is etched by a dipping system, making it easy to etch.

When the etching characteristics and the resistivity of such an IZO material is compared with those of the ITO, the IZO can be etched within a shorter period of time at a lower (or normal) temperature using a lower concentration of etchant when compared with ITO as indicated by the following table. Also, the IZO has a resistivity slightly higher than the ITO.

TABLE 2

| | IZO | ITO |
|---|---|---|
| Resistivity | 360 μΩ cm | Below 250 μΩ cm |
| Crystalline Structure | Amorphous | Poly |
| Etching Rate | 550 Å/min | 9.5 Å/min |
| Etching Speed | Within 300 Sec. | Above 1000 Sec. |
| Etching Temperature | 25° C. | Above 30° C. |
| Mixing Ratio of Etchant | 1:180 | Below 1:10 |

As seen from the above Table 1, an etchant for etching IZO according to the present invention is a mixture having a ratio of oxalic acid ($C_2H_2O_4$) to de-ionized water is 1:180. An interfacial active agent for improving the mixing uniformity of $C_2H_2O_4$ to de-ionized water may be added to the etchant. To set the ratio of $C_2H_2O_4$ to de-ionized water to be 1:180 aims at assuring a sufficient etching control margin, even when the acid concentration is low and the etching speed is fast, as seen from the following Table 3 and FIG. 4.

TABLE 3

| $C_2H_2O_4$:DI | Temperature (° C.) | Etching Rate (Å/sec) |
|---|---|---|
| 1:30 | 25 | 15.2 |
| 1:128 | 25 | 15.3 |
| 1:180 | 25 | 9.4 |
| 1:350 | 25 | 6.1 |

Figure 4:
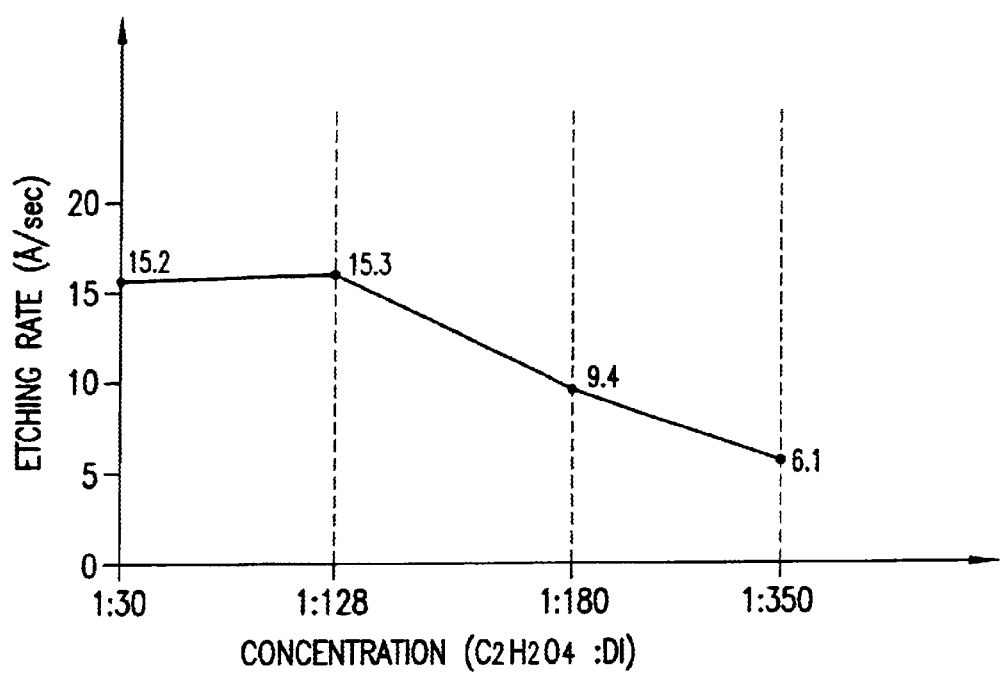
FIG. 4 is a characteristic graph representing the etching rate depending on the composition of the etchant according to an embodiment of the present invention.

More specifically, as seen from Table 3 and FIG. 4, the concentration and etching speed is too high when the ratio of $C_2H_2O_4$ to de-ionized water is 1:30 or 1:128, thus, it is difficult to provide an etching control when etching IZO. When the concentration of $C_2H_2O_4$ is low such that the ratio of $C_2H_2O_4$ to de-ionized water is 1:350, the etching speed becomes slow. Thus, it is desirable that a composition of an etchant for etching the IZO film, that is, the ratio of $C_2H_2O_4$ to de-ionized water should be 1:180 in consideration providing an etching control margin, an etching speed and an acid concentration.

Figure 5:
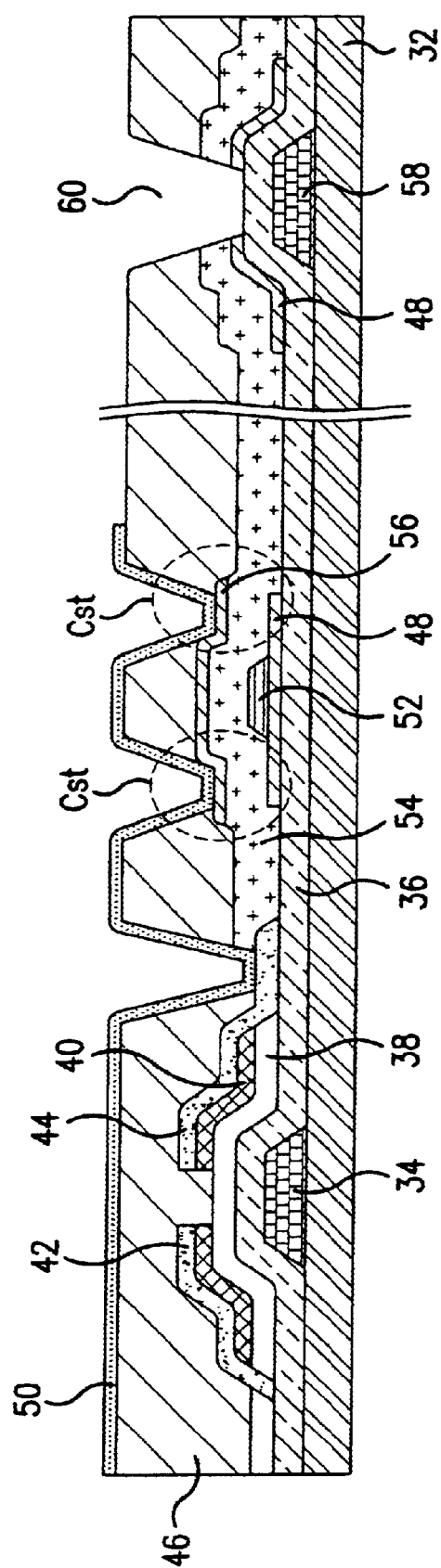
FIG. 5 is a section view showing the structure of an X-ray detecting device according to an embodiment of the present invention.

FIG. 5 shows the structure of a transparent electrode according to a second embodiment of the present invention wherein a pixel electrode is applied to an X-ray detecting device. Referring to FIG. 5, a TFT array of the present X-ray detecting device includes a TFT containing a gate electrode 34, a source electrode 42, a drain electrode 44, an organic insulating film 46 covering the TFT, a pixel electrode 50 provided on the organic insulating film 46, a storage capacitor Cst provided between an upper transparent electrode 56 and a lower transparent electrode 48, and a ground line 52 connected to the storage capacitor Cst. The TFT, the storage capacitor Cst and the ground line are covered with the organic insulating film 46.

The pixel electrode 50 formed on the organic insulating film 46 covers the TFT, the storage capacitor Cst and the ground line 52. The storage capacitor Cst plays the role of charging an X-ray sensing signal applied from the pixel electrode 50, and applies the X-ray sensing signal to a data line connected to the source electrode 42 in a time interval at which a channel is being formed between the source electrode 42 and the drain electrode 44 of the TFT. An inorganic insulating film 54 such as $SiN_x$, etc. is formed between the upper and lower transparent electrodes 56 and 48 serving as an electrode for the storage capacitor Cst. A photo-detecting layer for detecting an X-ray is provided on the pixel electrode 50. The photo-detecting layer is made from selenium.

In the present invention, the upper and lower transparent electrodes 56 and 48 are made from IZO. As mentioned above, the IZO has an excellent interface adhesion characteristic with respect to the organic insulating film 46 and can be etched within a short time with a low concentration of etchant. Accordingly, the edge of the pixel electrode 50 is not bent or damaged after etching thereof. In this case, since the thickness of the ITO film existing in the bottom surface of the contact hole 60 is approximately two times larger than that of the ITO film for the pixel electrode 50 upon patterning of the pixel electrode 50, a residual film may be often left after etching of the ITO film. On the other hand, if the pixel electrode 50and the upper and lower transparent electrodes 56 and 48 are IZO films, an etching of the ITO film is conducted rapidly even when the ITO film, having approximately twice the thickness at the bottom surface of the contact hole 60, is simultaneously etched upon etching of the ITO film for the pixel electrode 50. Thus, it becomes possible to minimize the defect of an IZO residual film left at the bottom surface of the contact hole 60. More specifically, upon patterning of the pixel electrode 50, the ITO film for the pixel electrode 50 and the ITO film having the twice thickness within the contact hole 60 are etched simultaneously. At this time, since the etching rate of the IZO film is approximately 60 times higher than that of the ITO film as seen from the above Table 2, the ITO film for the pixel electrode 50 having a thickness of about 500 Å and the IZO film having a thickness of about 1000 Å formed on the bottom surface of the contact hole 60 can be almost simultaneously etched. Accordingly, a patterning of the pixel electrode 50 can be easily made with no residual IZO film within the contact hole 60.

As described above, according to the present invention, the IZO is able to be etched within a short time with a low concentration of etchant and is applied to the pixel electrode to improve the etching characteristic. An etchant for etching the transparent electrode according to the present invention is a mixture of oxalic acid $C_2H_2O_4$ and de-ionized water in ratio of 1:180, respectively. Thus, a low acid concentration sufficiently assures an etching control margin for the IZO, and has a fast etching speed with respect to the IZO, so that it is suitable for etching a transparent electrode employing the IZO.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A transparent electrode formed under an organic insulating film in an x-ray detecting device, the x-ray detecting device including a capacitor for charging a signal sensing an x-ray, the capacitor including the transparent electrode and a second transparent electrode separated by an inorganic insulating film, wherein the electrodes of the capacitor are made of indium-zinc-oxide (IZO) having a fast etching speed.

2. The transparent electrode according to claim 1, wherein the x-ray detecting device includes a thin film transistor under the organic insulating film.

3. The transparent electrode according to claim 1, wherein the inorganic insulating film comprises SiNx.

4. The transparent electrode according to claim 1, wherein the organic insulating film has been cured under a nitrogen atmosphere.

5. The transparent electrode according to claim 1, wherein the IZO has been deposited by sputtering.

* * * * *